Patented Dec. 30, 1930

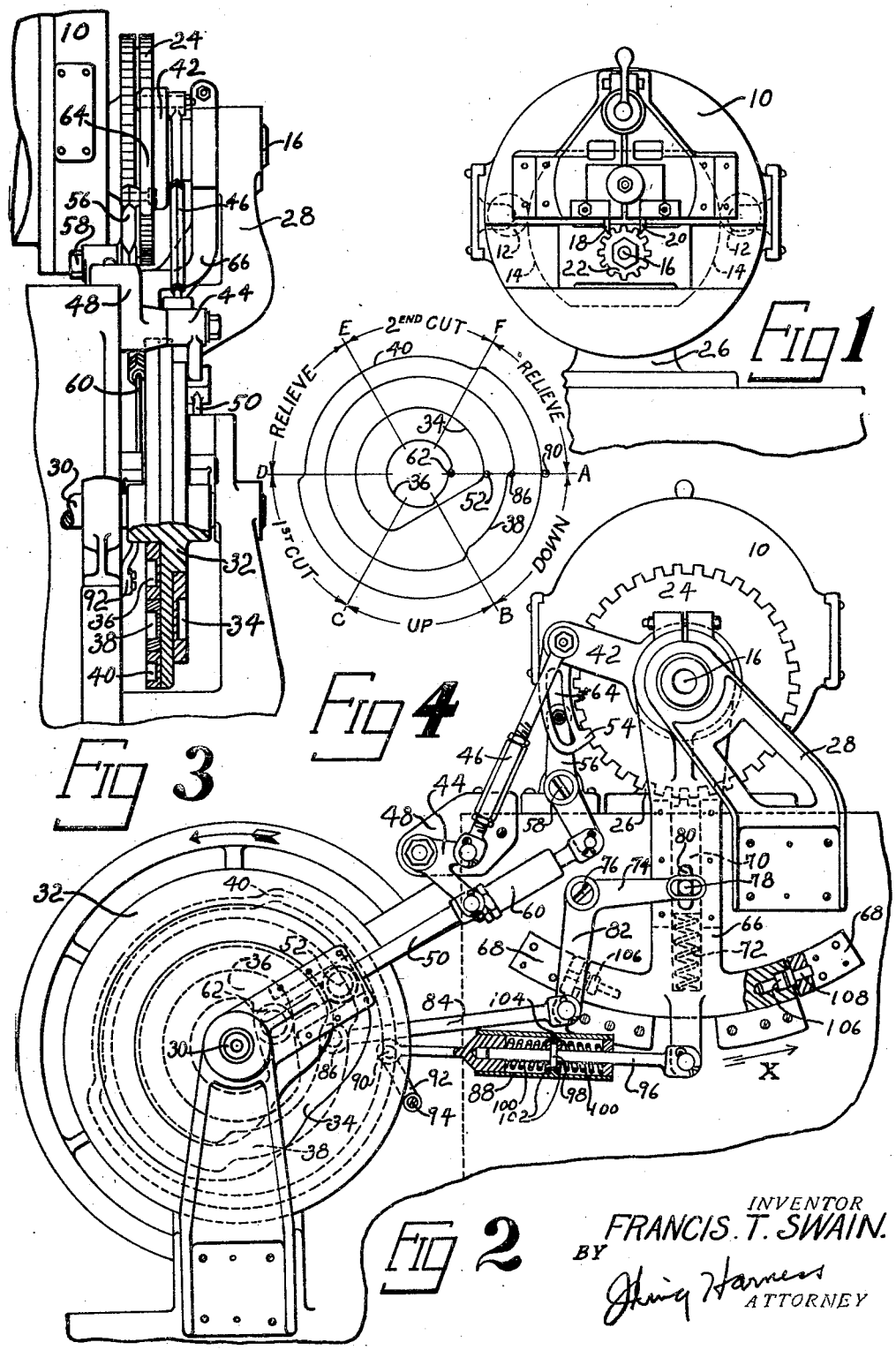

1,786,551

UNITED STATES PATENT OFFICE

FRANCIS T. SWAIN, OF NEWCASTLE, INDIANA

GEAR-CUTTING MACHINE

Application filed March 26, 1927. Serial No. 178,594.

This invention relates to a gear cutting machine and more particularly to a machine for indexing a gear blank to be finished on the gear cutting machine.

It is an important object of this invention to hold a gear blank in a definite position during the operation of cutting the face of the tooth and to relieve the tooth from the cutter by slightly backing the tooth away from the cutter during the return movement of the tool.

Another object of the invention is to automatically index the gear after the cutting of one tooth face to a position for cutting the face of the next gear tooth.

A further object of the invention is to provide a means for holding the gear in a predetermined position, applying a pressure to said means to urge the gear in an angular direction corresponding to the direction of the cut, and applying a pressure to said means in the opposite direction to relieve the gear tooth from the cutter when the cutter is being returned.

These and further objects of the invention will more fully appear from the following description taken in connection with the accompanying drawings in which:

Fig. 1 is a front end view of a gear cutting machine.

Fig. 2 is a rear end view of a gear cutting machine showing one adaptation of my invention.

Fig. 3 is a side elevation of Fig. 2, parts being broken away.

Fig. 4 is a diagrammatic view illustrating the arrangement of the cams and the steps of operation.

Referring to the drawings, the machine selected for illustrating one adaptation of my invention, an oscillating head 10 is adapted to be supported thru rollers 12 on a cam 14 the outer surface thereof conforming to an involute curve. The cam 14 is mounted on an axis or shaft 16. A pair of cutters 18 and 20 are adjustably supported on the head 10. A roughed gear blank 22 is supported on the shaft 16 and as the head 10 is oscillated on the involute cam 14, an involute cut is made on one tooth in the direction of its roll by first the cutter 18 and then on another tooth by the cutter 20.

The driving mechanism for this operation has not been shown but is clearly illustrated and described in a copending application, Serial No. 178,596 filed March 26, 1927.

It is important to securely hold the gear 22 during its cutting operation, to relieve the gear from the cutter during the return movement of the cutter, and to index or advance the gear to a position for cutting the next tooth. To this end the invention is particularly concerned and the following description relates to a novel means for holding and indexing the gear in relation to the cutting tools.

Referring particularly to Fig. 2 the mechanism has been mounted on the rear end of the machine. The shaft 16, forming the axis for the gear 22 at one end, is extended thru the head 10 and is provided with a toothed member 24 at its opposite end. The shaft 16 is supported within the head by a boss 26 and an arm 28 supports the outer end.

Mounted on a shaft 30 and driven in a counterclockwise direction is a member 32 having a plurality of cam surfaces on its opposite faces. The drive for this member is not shown but it is to be understood that a drive for the machine is common to both the shaft 30 and head 10. The member 32 is provided with an indexing cam 34, a pawl operating cam 36, a lock operating cam 38 and a cam 40 for operating the relief mechanism. Each cam is formed in a separate part secured to the member 32 so that replacement may be made, either for worn parts or to change the size and shape of the cams. The cams are in the shape of grooves to receive rollers on the end of operating rods.

The mechanism has been shown in a position ready for indexing. Pivoted on the shaft 16 is an arm 42 which is connected to one arm of a bell crank lever 44 thru an adjustable link 46. The crank 44 is pivoted to a bracket 48 secured to the base of the machine. A link 50 has one end connected to the other arm of the crank lever 44 and has its opposite end provided with a roller 52 in the cam groove 34. When the member 32 is rotated in a counterclockwise direction the cam 34 will draw the link 50 toward its center and this movement operating thru link 46 will pull the arm 42 downward. Pivotally connected to the arm 42 is a pawl 54 in engagement with the toothed member 24 so that when the arm 42 is pulled down the member 24, shaft 16 and gear 22 are rotated or indexed to the next cutting position. When the roller 52 has reached its inner position, the shortest radius of the cam 34, the pawl 54 is withdrawn from its engagement with the toothed member 24 and the arm 42 is returned to the position shown on the drawing. The pawl is operated by a crank lever 56 pivoted at 58 and operatively connected to an adjustable link 60. The lower end of the link 60 is provided with a roller 62 which fits the pawl operating cam 36. The pawl 54 is in engagement with the toothed member 24 during the downward movement of the arm 42 and remains out of engagement when the arm is returning. A slot 64 has been formed in the pawl 54 to permit relative movement between the arm 56 and pawl 54.

Pivotally mounted on the shaft 16 is an arm 66 extending downward and adapted for limited swinging movement between stops 68. Slidably mounted on the arm 66 is a lock member 70 adapted to engage the toothed member 24 resiliently held in engagement therewith by a spring 72. This lock when engaged rocks the member 24, shaft 16 and gear 22 with the arm 66 but when disengaged the member 24, shaft 16 and gear 22 may be moved by the arm 42 and pawl 54 relative to the arm 66. It will be understood that when the pawl is engaged the lock 70 is disengaged. The lock 70 is shown withdrawn by a slotted arm 74 pivoted to the housing as at 76. The arm 74 is connected to a pin 78 on the lock 70. The pin 78 moves in a slot 80 on the arm 66. Secured to the arm 74 is another arm 82 having a link 84 movable by a roller 86 in the lock operating cam 38.

The movement of the lever 66 is accomplished by a resilient link 88 having one end connected to the lever 66 and its opposite end provided with a roller 90 held in the cam groove 40 by a link 92 pivoted at 94. One end of the link 88 comprises a rod 96 having an annular flange 98 and the other end of the link is formed tubular surrounding the flange with a pair of springs 100 at opposite sides of the flange 98. An abutment is formed in the tubular member for each of the outer ends of the springs. Washers 102 abutting against the opposite sides of the flange 98 and a flange 104 serve as abutments for the inner ends of the springs 100. Thus the flange and rod 96 is resiliently held in central position adapted to move in either direction. The arm 66 is adapted for slight movement and to obviate the necessity of machining the cam 40 to exact dimensions to accurately position the arm 66, the resilient connection is desirable.

The opposite sides of the arm 66 are provided with depressed heads 106 and the stops 68 are provided with heads 108 adapted to enter the depressed portion and abut against the heads 106.

Referring to the operation of the device and particularly to Fig. 4, the complete cycle has been divided up into six steps illustrated as A, B, C, D, E and F. A to C is the indexing, A to B the downward movement of the arms 42 and B to C the upward movement of the arm 42. C to D indicates the operation of the machine during the first cutting operation, D to E the relief or backing off of the gear for the return of the cutter, E to F the second cutting operation in the opposite direction to that of the first cut and on another tooth, and F to A the relief in the opposite direction to that of the second cut. As illustrated the arm is in one of two positions, the relief after the first cut places the gear in position for the second cut and when relieved from the second cut it is placed in position for the first cut of the next cycle, remaining therethru the indexing operation. However, the cam 40 may be designed to have a central position returning the gear to a neutral position after the relief and moving it to its cutting position before or after the indexing operation.

With the pawl 54 engaged and the lock 70 disengaged as shown on the drawings the arm 42 rotates the member 24 counterclockwise. When the arm 42 has reached its extreme downward position, determined by the cam 34, the pawl 54 is disengaged and the lock 70 is engaged with the arm 66 held in the first cutting position indicated by arrow X. After the cut is made the cam 40 causes the arm 66 to swing in the opposite direction to relieve the tooth from the cutter and into position for the second cutting operation.

While one embodiment of my invention has been illustrated and described it is to be understood that various changes may be made without departing from the spirit thereof and it is not my intention to limit its scope other than by the terms of the appended claims.

What I claim is:

1. The method of cutting a gear which consists in cutting the face of one tooth in the direction of its roll, moving the gear away from one cutter during the return movement of the cutter to a position for cutting the face of another tooth by another cutter, cutting the opposite face of the other tooth in the direction of its roll and opposite to that of the first cutting operation, returning the gear to its first position during the return movement of the cutter after the second cutting operation, indexing the gear to cut a face of a tooth adjacent the tooth first cut, and repeating the aforesaid operations.

2. The method of cutting a gear which consists in cutting the face of an involute gear tooth in the direction of its roll, relieving the gear from one cutter during the return movement of the cutter, cutting the opposite face of another tooth in the direction of its roll by another cutter, relieving the gear from the cutter during the return movement of the cutter, indexing the gear to a position for cutting the surfaces of the other teeth, and repeating the aforesaid operations.

3. The method of cutting a gear which consists in cutting the face of an involute gear tooth in the direction of its roll, holding the gear in the direction of the cut, relieving the gear from one cutter during the return movement of the cutter, cutting the apposite face of another tooth in the direction of its roll by another cutter, holding the gear in the direction of the cut, returning the gear to its first position during the return movement of the cutter, and indexing the gear to a position for cutting the surface of the other teeth.

4. In a machine of the class described comprising a gear supporting member, means for rocking said support about the axis of the gear in one direction and positively holding it in a predetermined position during a cutting operation, means for rocking said support about the axis of the gear in the opposite direction at the end of the cutting operation, and means for indexing said support.

5. In a machine of the class described comprising a gear supporting member, a pair of cutting edges adjacent said support for cutting involute surfaces on the working surface of a gear on said support, means for holding said support in the direction of the cut made by one of said tools, means for moving said support in the opposite direction immediately after the cutting operation, means for holding said support in the direction of the cut made by the other of said tools, means for moving said support in the opposite direction immediately after the last mentioned cutting operation, and means for indexing said support to repeat the aforesaid operations on adjacent teeth.

6. In a machine of the class described comprising a gear supporting member, a gear secured to said member, a pair of cutting edges adjacent said support for cutting involute surfaces on the opposite faces of different teeth of said gear, resilient means for rocking said support between rigid stops in the direction of each cutting operation, and means for indexing said support and gear.

7. In a machine of the class described comprising a gear supporting member, a gear secured to said member, a pair of cutting edges adjacent said support for cutting involute surfaces on the opposite faces of different teeth of said gear, means for rocking said support between rigid stops in the direction of each cutting operation, means for rocking said support in the opposite direction to each of said cuts immediately after the cut has been made, and means for indexing said support and gear.

8. In an indexing mechanism of the class described comprising a gear supporting member, a toothed member carried by said gear supporting member, an arm pivoted axially with said supporting member, a pawl carried by said arm for engaging with said toothed member, cam operated means for angularly moving said arm in one direction with the pawl engaged, cam operated means for disengaging said pawl to permit return movement of said arm and pawl independent of said toothed member and its support.

9. In an indexing mechanism of the class described comprising a gear supporting member, a toothed member carried by said gear supporting member, an arm pivoted axially with said supporting member adapted for limited angular movement, a lock carried by said arm adapted for engagement with said toothed member, another arm pivoted axially with said supporting member, a pawl carried by said arm for engagement with said toothed member, cam operated means for angularly moving said first mentioned arm, cam operated means for engaging or disengaging said lock, cam operated means for angularly moving the other of said arms in one direction with the pawl engaged, cam operated means for disengaging said pawl to permit return movement of said arm and pawl independent of said toothed member and its support.

10. In a machine of the class described comprising, a gear supporting member, a gear secured to said member, a pair of cutting edges adjacent said support for cutting involute surfaces on the opposite faces of different teeth of said gear, an arm pivoted axially with said supporting member adapted for limited angular movement, a lock carried by said arm adapted for engagement with said toothed member, means for rocking said support thru said arm and lock in the direction of each cutting operation and before said cutting operation, means for rocking said support in the opposite direction to each of said cuts immediately after the cut has been made, means for indexing said support and gear, and means for disengaging said lock during the indexing movement of said support and gear.

FRANCIS T. SWAIN.